(12) United States Patent
Azimipour et al.

(10) Patent No.: US 8,575,250 B2
(45) Date of Patent: Nov. 5, 2013

(54) STABILIZED POLYMER COMPOSITIONS

(75) Inventors: Bahar Azimipour, Malvern, PA (US); Jian-Yang Cho, Blue Bell, PA (US); Eric G. Lundquist, North Wales, PA (US); Gene Norris, West Chester, OH (US)

(73) Assignee: Rohm and Haas Company, Philadelphia, PA (US)

( * ) Notice: Subject to any disclaimer, the term of this patent is extended or adjusted under 35 U.S.C. 154(b) by 39 days.

(21) Appl. No.: 12/661,953

(22) Filed: Mar. 26, 2010

(65) Prior Publication Data
US 2010/0267873 A1    Oct. 21, 2010

Related U.S. Application Data

(60) Provisional application No. 61/212,735, filed on Apr. 15, 2009.

(51) Int. Cl.
*C08K 5/58* (2006.01)
*C08K 5/57* (2006.01)

(52) U.S. Cl.
USPC ............................ 524/178; 524/181; 524/179

(58) Field of Classification Search
USPC ........................................ 524/178, 179, 181
See application file for complete search history.

(56) References Cited

U.S. PATENT DOCUMENTS

| 4,255,320 | A | * | 3/1981 | Brecker et al. ................ 524/181 |
| 4,681,907 | A | * | 7/1987 | Mesch et al. .................. 524/180 |
| 5,100,946 | A | | 3/1992 | Hung et al. |
| 5,252,667 | A | | 10/1993 | Parker |
| 5,340,862 | A | * | 8/1994 | Silbermann et al. .......... 524/178 |

FOREIGN PATENT DOCUMENTS

| EP | 107 063 | | 5/1984 |
| EP | 0 492 803 | B1 | 7/1992 |

* cited by examiner

*Primary Examiner* — Robert D. Harlan
(74) *Attorney, Agent, or Firm* — Tifani M. Edwards

(57) ABSTRACT

This invention relates to the thermal stabilization of halogen-containing polymer compositions, more particularly, this invention relates to a poly(vinyl chloride) (PVC) or a chlorinated polyvinyl chloride (cPVC) composition comprising a methyl tin stabilizer and at least one salt of a polyacid material such as a polycarboxylic acid, a phosphoric acid, or a boric acid.

2 Claims, No Drawings

STABILIZED POLYMER COMPOSITIONS

This patent application claims the benefit of the earlier filed U.S. patent application Ser. No. 61/212,735 filed on Apr. 15, 2009 under 37 CFR 1.55(a).

This invention relates to the thermal stabilization of halogen-containing polymer compositions, more particularly, this invention relates to a poly(vinyl chloride) (PVC) or a chlorinated polyvinyl chloride (cPVC) composition comprising a methyl tin stabilizer and at least one salt of a polyacid material such as a polycarboxylic acid, a phosphoric acid or a sulfonic acid or a boric acid.

It is well known that halogen-containing polymers are normally susceptible to heat-induced deterioration and that the physical properties of such polymers deteriorate and color changes take place during processing at elevated temperatures. Undesirable color changes within the polymer often occur within the first 5 to 15 minutes as well as during later stages of thermal processing. Examples of such polymers are the vinyl and vinylidene polymers in which the halogen is attached directly to carbon atoms. Poly(vinyl chloride), chlorinated polyvinyl chloride, polyvinylidene chloride, chlorinated polyethylene, polyvinylidene fluoride, copolymers of vinyl chloride and poly(vinylidene chloride), are the most familiar polymers which require stabilization for their survival during fabrication into pipe, window profile, siding, bottles, wall covering, packaging film, and the like.

A great deal of work has been done in the development of more effective thermal stabilizers and organotin-based heat stabilizers have become one of the most efficient and widely used stabilizers for rigid PVC. However, the high cost of tin metal has significantly impacted the cost performance balance of tin based stabilizers making them less economically attractive. U.S. Pat. No. 5,100,946 seeks to solve the problems of the art by providing a stabilized PVC composition containing a stabilizer and at least one metal salt of a carboxylic acid having at least two carboxyl groups. The reference discloses dialkyl butyl and octyl tin mercaptides and/or alkyl tin mercaptoesters with sulfide bridges combined with disodium adipate salts to produce a stabilized PVC composition. In addition to the high cost of tin metal, the health and environmental concerns over the use of butyl and octyl tin stabilizers have led to the search for less hazardous alternatives. Thus a more cost effective, less hazardous stabilizer would be of significant value for use in the stabilization of halogen containing polymers and copolymers such as PVC.

We have found that the combination of a salt of a poly carboxylic acid or phosphoric acid or sulfonic acid or boric acid having at least two acidic groups and a methyl tin stabilizer surprisingly and uniquely improves the performance of the methyl tin stabilizer and provides a lower cost, safer heat stabilizer. Although the use of polycarboxylate salts and phosphate salts such as sodium adipate and disodium phosphate have been proposed to stabilize polyvinyl chloride and chlorinated polyvinyl chloride in combination with tin stabilizers, it has now been discovered that a desired synergistic effect is observed when the polycarboxylic acid or the phosphoric acid or the sulfonic acid or the boric acid salts are used in combination with methyl tin stabilizers and most notably with methyl tin stabilizers comprising greater than 25% by weight of the mono methyl tin mercaptan species.

According to one aspect of the present invention, there is provided a stabilized halogen containing polymer composition comprising:
a) greater than 40% by weight of a halogenated polymeric material;
b) 0.01 to 5.0 phr of a methyl tin stabilizer comprising a mixture of mono methyl tin stabilizer and dimethyl tin stabilizer wherein the mono methyl tin stabilizer is greater than 25% by weight of the methyl tin stabilizer; and
c) 0.01 to 5 phr of a salt of a polyacid material.

According to a second aspect of the present invention, there is provided a stabilized halogen containing polymer composition comprising:
a) greater than 40% by weight of a halogenated polymer material wherein the halogenated polymer material comprises vinyl chloride, vinyl fluoride, vinylidene chloride, and vinylidene fluoride, and chlorinated polyvinyl chloride, chlorinated polyethylene or mixtures thereof;
b) greater than 0.3 phr of a monomethyl tin stabilizer; and
c) 0.01 to 5 phr of a salt of a polyacid material.

As used herein by "polyacid," is meant materials containing 2 or more acidic groups.

As used herein by "phr" is meant part per 100 parts of halogenated polymer ie. PVC.

As used herein by "PVC composition" is meant a poly (vinyl chloride) (PVC) or a chlorinated polyvinyl chloride (cPVC) composition. Herein, the terms "PVC" and "halogen containing polymeric mixture" or the like are used interchangeably.

As used herein by "hydrocarbyl" is meant a hydrocarbon group containing carbon and hydrogen.

All percentages are weight percentages, and all temperatures are in ° C., unless otherwise indicated. Percentages of mono methyl tin stabilizer and di methyl tin stabilizers are represented as weight percentages of the methyl tin stabilizer species used.

As used herein, by "methyl tin stabilizers" is meant mixtures of mono and di methyl tin mercaptans which can be represented by the following formulas:

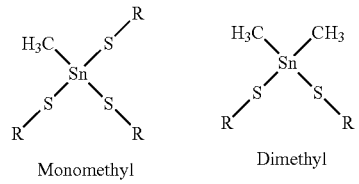

Monomethyl    Dimethyl where R= is a substituted or unsubstituted hydrocarbyl group, R=R¹—O—C(=O)—R², R=R¹—C(=O)—O—R³' where R¹ is a $C_1$-$C_{20}$ hydrocarbyl group and R² is a substituted or unsubstituted hydrocarbyl group and R³ is a substituted or unsubstituted hydrocarbyl group or hydrogen.

The present invention relates to a stabilized halogen containing polymer composition. The stabilized halogen-containing polymer composition comprises a polymeric material wherein the polymeric material comprises a halogen containing polymeric composition, at least one methyl tin stabilizer, and at least one salt of a polyacid where the polyacid is a carboxylic acid, sulfonic acid, phosphoric acid, or boric acid having at least two acidic groups.

The polymeric material can be a rigid polymeric material, or a flexible polymeric material plasticized with a non-chlorinated plasticizer. By rigid, it is meant that the polymer contains substantially no plasticizer. By flexible, it is meant that the polymer contains plasticizer. Suitable plasticizers include, but are not limited to, phthalate esters, as well as adipates, azelates, phosphates, and epoxidized oil. A commonly used plasticizer is di(2-ethylhexyl) phthalate (DOP). Other useful plasticizers include tricresyl phosphate, dibutyl phthalate, dibutyl sebacate, tributyl phosphate, epoxidized esters, dioctyl phthalate, trioctyl phosphate, dioctyl sebacate and adipate, and various low-molecular weight polymers such as poly(polypropylene glycol) esters are now widely utilized as plasticizers for the vinyls. The plasticizer content varies widely with the end use of the material, but typically is from 10 to 60 percent by weight.

It is contemplated that the halogen containing polymeric material comprises a poly(vinyl chloride) homopolymer.

Halogen containing polymers which are stabilized include but are not limited to poly(vinyl chloride), chlorinated poly(vinyl chloride) and polyvinylidene chloride with poly(vinyl chloride) homopolymers being favored. The halogen containing polymers can include copolymers with vinyl acetate, vinylidene chloride, methacrylates, acrylates, styrene, dialkyl fumarate or maleate, or other alkyl esters of mono-olefinic acids, as well as blends and alloys with other thermoplastic resins. The halogen containing polymer may include polyvinyl halogen polymer, including the poly(vinyl chloride), although others such as the bromide or fluoride may be used. Also useful are halogenated polyolefins such as chlorinated polyethylene.

In general, halogen containing polymers are vinyl halide polymer compositions including homopolymers of vinyl halide monomers, copolymers of vinyl halide monomers with other monomers and including both block and graft copolymers, and alloys, blends and mixtures of vinyl halide polymers with other polymers.

Useful polymers in the composition of the present invention include: copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate and other alkyl acrylates, methyl methacrylate, ethyl methacrylate, butyl methacrylates, hydroxy-ethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, trichloroethylene, 1-fluoro-1-chloro-ethylene, acrylonitrile, chloro-acrylonitrile, allylidene diacetate, chloroallylidene diacetate, and ethylene and propylene.

Polymer blends useful in the present invention include blends of: poly(vinyl chloride) and poly(ethylene), poly(vinyl chloride) and poly(methyl methacrylate), poly(vinyl chloride) and poly(butyl methacrylate), poly(vinyl chloride) and polystyrene; poly(vinyl chloride) and acrylonitrile-butadiene-styrene copolymer, and poly(vinyl chloride) and poly(methyl methacrylate).

Polymer blends useful in the practice of this invention can comprise physical blends of at least two distinct polymeric species where one of the polymeric species comprises a matrix or continuous phase of the halogen containing polymer. It is contemplated that the composition of the present invention includes embodiments where the halogen containing polymeric material is 100 percent of the polymeric blend. The non-halogen-containing polymeric material in the polymeric blend may comprise 40% alternatively 25%, or alternatively 10% of the halogen containing polymer composition.

This invention is a formulation comprising from 40 to 99.9% by weight of one or more halogenated polymers and 0.1 to 5% by weight of a methyl tin stabilizer. In the case of the methyl tin stabilizer, the formulation comprises a mixture of mono and di methyl stabilizers in which the mono methyl tin mercaptan content is greater than 25% by weight. Alternate stabilizer compositions contain greater than 40%, 50%, 70%, 80% or 90% by weight of mono methyl tin mercaptan.

Alternatively, instead of being expressed in terms of weight percentages, the amount of monomethyl tin stabilizer in the halogen-containing polymer composition or blend may be determined by multiplying the % of monomethyl tin mercaptan in the monomethyl/dimethyl tin mercaptan mixture by the phr of the methyl tin stabilizer used in the PVC formulation. For example, if 1.0 phr of an 80% monomethyl tin mercaptan, 20% dimethyl tin stabilizer mixture was used in a PVC formulation then this formulation would contain 0.8 phr of a monomethyl tin stabilizer. In one embodiment of this invention the PVC formulation contains greater than 0.3 phr of a monomethyl tin stabilizer. Alternatively the PVC formulation contains greater than 0.4 phr, 0.5 phr, 0.6 phr, 0.7 phr, 0.8 phr, or 0.9 phr of a monomethyl tin stabilizer.

Examples of methyl tin stabilizers useful in the present invention include but are not limited to mono and di methyl tin mercaptans such as mono and dimethyl tin dodecylmercaptides mono and di methyl tin mercaptoesters such as mono and di methyl tin 2-ethylhexyl thioglycolates and reverse mercapto esters such as mono and di methyl tin mercaptoethyloleates and mercaptoethyltallates. Preferred are methyl tin stabilizers that do not contain sulfide bridges between tin metal centers.

The salt of a polycarboxylic acid or phosphoric acid or sulfonic acid or boric acid having at least two acidic groups useful in the present invention can be molecular or polymeric in nature. The salts can be metal salts such as sodium, potassium, calcium, magnesium and lithium or can be amines.

Examples of such salts of a polycarboxylic compounds include but are not limited to salts of adipic acid, maleic acid, fumaric acid, succinic acid, itaconcic acid, citric acid, glycolic acid, phthalic acid, 1,2,4-benzenetricarboxylic acid, 1,2,4,5-benzenetetracarboxylic acid, ethylene diamine tetraacetic acid, methylglycinediacetic acid, nitrilotriacetic acid, salts of mono citrate esters, dithiodiglycolic acid, 3,3-dithiodiproponic acid, disodium glutamate and salts of glutamate amides. Examples of such salts of phosphoric acid compounds include but are not limited to trisodium phosphate, disodium phosphate, monosodium phosphate, and monosodium and disodium salts of phosphate esters. Examples of such salts of sulfonic acid compounds include disodium salts of sulfosuccinicate half esters and amides Examples of such salts of boric acid include sodium borate.

Non-limiting polymeric examples of salts of a polycarboxylic acid include neutralized homopolymers and copolymers of acrylic acid and methacrylic acid with styrene and (meth)acrylic ester monomers. Copolymers such as, for example, polymethylmethacrylate copolyacrylic acid sodium salt, polybutylacrylate copolyacrylic acid sodium salt, polystyrene copoly(meth)acrylic acid sodium salt are also useful.

The salt of a polycarboxylic acid or phosphoric acid or sulfonic acid or boric acid having at least two acidic groups can be added directly to the halogen containing polymeric mixture or can be blended with other ingredients used in halogen containing polymeric mixture processing such as processing aids, fillers, polymers, impact modifiers, pigments, lubricants and stabilizers. For example, the polycarboxylic acid, phosphoric acid, sulfonic acid or boric acid salt may be dissolved in water and then added to an aqueous emulsion of an impact modifier or processing aid and then spray dried together to form an intimate powder of polymer and the polycarboxylate salt, sulfonate salt, phosphate salt or borate salt.

The amount of the methyl tin stabilizer and salt of a carboxylic acid, phosphoric acid, sulfonic acid or boric acid having at least two acidic groups may vary to attain the stability required for the particular processing conditions and halogen polymer used. The use of the above polycarboxylate, phosphoric acid, sulfonic acid or boric acid salt present allows the PVC compound to achieve equivalent stability with the use of less tin based stabilizer. It has been found that the amount of methyl tin stabilizer can be reduced up to 50 percent by weight with equivalent or better stabilization and color retention. Typically, compositions contain from 0.01 to 5.0, alternatively from 0.1 to 3.0, alternatively from 0.1 to 2.0, or alternatively from 0.3 to 1.5 parts per hundred of methyl tin stabilizer per hundred parts of halogenated polymer Typically, compositions contain from 0.01 to 5.0, alternatively from 0.1 to 3.0, alternatively from 0.1 to 2.0, or alternatively from 0.3 to 1.5 parts per hundred of a salt of a polycarboxylic acid, phosphoric acid, sulfonic acid or boric acid having at least two acidic groups, per hundred parts of halogenated polymer.

Tin based stabilizers useful in the present invention can include organotin stabilizers including mercaptide and mercapto-ester based tin stabilizers. Suitable examples of methyl tin stabilizers useful in the present invention include but are not limited to mono and di methyl tin mercaptans such as mono and dimethyl tin dodecylmercaptides, mono and di methyl tin mercaptoesters such as mono and di methyl tin 2-ethylhexyl thioglycolates and reverse mercapto esters such as mono and di methyl tin mercaptoethyloleates and mercaptoethyltallates. Sulfur bridged methyl tin compounds are also contemplated but not preferred.

The stabilized halogen containing polymer compositions of the present invention can be compounded for extrusion, injection molding, blow molding and calendaring, and can be formed into such finished articles as fibers, wire and cable, siding, window profiles, foam sheet, pipe, elbows and other pipe fittings, film, sheets and bottles. The stabilized halogen containing polymer compositions can be mixed with other ingredients such as dyes, pigments, flameproofing agents, internal and external lubricants, impact modifiers, and processing aids, blowing agents, fillers and with other additives to prevent, reduce or mask discoloration or deterioration caused by heating, aging, exposure to light or weathering.

The following examples illustrate the present invention. The examples should not be construed as limiting the invention. Parts are parts per hundred parts of resin (phr) unless otherwise indicated.

EXAMPLES

The dynamic stability of the compositions can be monitored with a rheometer, such as a BRABENDER® PLASTI-CORD rheometer or on a 2 roll mill such as a Collin® Mill. The performance of the various stabilizer additive compositions is indicated by Stability Time in minutes. Stability Time can be defined based on a yellowness index of samples taken over a period of time. The sample is put into a sample chamber of the torque rheometer and heats up as the rotors rotate. Initially, a Fusion Time is determined. The Fusion Time is the time for the powder to become molten. The fusion torque is a measure of work at Fusion Time in meter grams. As the sample becomes molten and the viscosity decreases, the torque decreases. The sample achieves an Equilibrium Torque at an Equilibrium time (minutes) which remains substantially constant or slightly decreasing. The composition remains in the molten state as indicated by the Equilibrium Torque value. When the composition begins to crosslink an increase in torque is observed. The term Stability Time is the time the composition begins to degrade or crosslink as shown by an increase in torque above the Equilibrium Torque value minus the Fusion Time.

Following is a listing of tin based stabilizers used in the Examples:
Stabilizer A=90% monomethyltin tri 2-ethylhexylthioglycolate, 10% dimethyltin bis 2-ethylhexylthioglycolate
Stabilizer B=75% monomethyltin tri 2-ethylhexylthioglycolate, 25% dimethyltin bis 2-ethylhexylthioglycolate
Stabilizer C=50% monomethyltin tri 2-ethylhexylthioglycolate, 50% dimethyltin bis 2-ethylhexylthioglycolate
Stabilizer D=27% monomethyltin tri 2-ethylhexylthioglycolate, 73% dimethyltin bis 2-ethylhexylthioglycolate
Stabilizer E*=34% monooctyl tin tri 2-ethylhexylthioglycolate, 66% dioctyltin bis 2-ethylhexylthioglycolate (comparative)
Stabilizer F=27% monomethyltin tri mercaptoethyltallate, 73% dimethyltin bis mercaptoethyltallate
Stabilizer G=90% monomethyltin tri mercaptoethyltallate, 10% dimethyltinbismercaptoethyltallate
Stabilizer I*=53% monooctyl tin tri 2-ethylhexylthioglycolate, 47% dioctyltin bis 2-ethylhexylthioglycolate (comparative)

Example 1

TABLE 1

| PVC Formulation | |
|---|---|
| Oxy 195F PVC (Occidental Petroleum Co.) | 100 phr |
| Advawax ® 280 (Steramide, Rohm and Haas Co.) | 0.79 phr |
| Advalube ™ F1060L (Glyceroldioleate, Rohm and Haas Co.) | 0.68 phr |
| Advalube ™ E2101 (Pentaerythritol Ester Lubricant, Rohm and Haas Co.) | 0.23 phr |
| Paraloid ™ BTA-715 (MBS Impact Modifier, Rohm and Haas Co.) | 9.92 phr |
| Paraloid ™ K-175 (Acrylic Processing Aid, Rohm and Haas Company) | 0.85 phr |
| Toner | 0.002 phr |
| Stabilizer | |
| Polyacid additive | |

200 grams of the above mixture including the stabilizer and polyacid additive was added between the heated 195° C. rollers. The roller speed for the front roller was 26 RPM and the rear roller was 20 RPM. Hot PVC samples were taken from the rollers at the indicated times and the yellowness (indication of thermal stability) measured on a Labscan using ASTM method D-1925. Trisodium Citrate dehydrate was the Polyacid Additive.

TABLE 2

| | A | A | B | B | C | C | D | D | E* | E* |
|---|---|---|---|---|---|---|---|---|---|---|
| Stabilizer | | | | | | | | | | |
| % mono | 90 | 90 | 75 | 75 | 50 | 50 | 27 | 27 | 34 | 34 |
| phr | 1 | 0.75 | 1 | 0.75 | 1 | 0.75 | 1 | 0.75 | 1 | 0.75 |
| phr mono | 0.9 | 0.675 | 0.75 | 0.563 | 0.50 | 0.375 | 0.27 | 0.20 | 0.34 | 0.255 |
| phr Trisodium Citrate | 0 | 0.25 | 0 | 0.25 | 0 | 0.25 | 0 | 0.25 | 0 | 0.25 |
| Yellowness Index ASTM D-1925) | | | | | | | | | | |
| 4 min | 8.9 | 7.2 | 7.9 | 8.0 | 6.3 | 4.3 | 9.2 | 9.1 | 8.0 | 9.9 |
| 8 min | 20.7 | 16.4 | 16.4 | 15.3 | 11.8 | 12.8 | 14.3 | 22.1 | 17.0 | 52.2 |

TABLE 2-continued

| | A | A | B | B | C | C | D | D | E* | E* |
|---|---|---|---|---|---|---|---|---|---|---|
| 12 min | 53.1 | 33.2 | 38.3 | 27.0 | 25.2 | 27.1 | 23.2 | 44.4 | 37.5 | 116.3 |
| 16 min | 128.0 | 60.9 | 111.5 | 46.1 | 61.7 | 49.0 | 38.0 | 73.1 | 89.4 | |
| 20 min | 156.0 | 116.8 | 153.8 | 76.0 | 157.0 | 90.6 | 71.1 | 173.4 | 133.0 | |
| 24 min | | 168.6 | | 135.1 | | 179.3 | 186.1 | | | |

*Comparative

Example 2

Same PVC formulation and processing conditions as in Example 1 except sodium adipate is used as the polyacid additive.

TABLE 3

| | A | A | B | B | | D | E* | E* |
|---|---|---|---|---|---|---|---|---|
| Stabilizer | | | | | | | | |
| % mono | 90 | 90 | 75 | 75 | 27 | 27 | 34 | 34 |
| phr | 1.0 | 0.75 | 1.0 | 0.75 | 1.0 | 0.75 | 1.0 | 0.75 |
| phr mono | 0.9 | 0.675 | 0.75 | 0.563 | 0.27 | 0.20 | 0.34 | 0.255 |
| phr Disodium Adipate | 0 | 0.25 | 0 | 0.25 | 0 | 0.25 | 0 | 0.25 |
| Yellowness Index (ASTM D-1925) | | | | | | | | |
| 4 min | 8.23 | 10.6 | 7.81 | 9.54 | 13.4 | 19.0 | 6.84 | 11.2 |
| 8 min | 15.7 | 17.6 | 19.5 | 17.8 | 16.3 | 31.3 | 14.5 | 31.6 |
| 12 min | 31.7 | 28.1 | 48.9 | 27.3 | 27.5 | 44.7 | 31.0 | 56.8 |
| 16 min | 89.3 | 45.0 | 126.5 | 45.5 | 42.7 | 67.2 | 65.0 | 87.9 |
| 20 min | 143.2 | 66.9 | | 71.1 | 86.1 | 93.3 | 163.0 | 123.8 |
| 24 min | | 140.2 | | 143.6 | 195.5 | 128.8 | | 206.3 |

*Comparative

Example 3

Same PVC formulation and processing conditions as in Example 1 with trisodium citrate used as the polyacid salt additive.

TABLE 4

| | A | A | B | B | C | C | I* | I* | E* | E* |
|---|---|---|---|---|---|---|---|---|---|---|
| Stabilizer | | | | | | | | | | |
| % mono | 90 | 90 | 75 | 75 | 50 | 50 | 53 | 53 | 34 | 34 |
| phr | 1 | 0.75 | 1 | 0.75 | 1 | 0.75 | 1 | 0.75 | 1 | 0.75 |
| phr mono | 0.9 | 0.675 | 0.75 | 0.563 | 0.50 | 0.375 | 0.53 | 0.398 | 0.34 | 0.255 |
| phr Trisodium Citrate | 0 | 0.25 | 0 | 0.25 | 0 | 0.25 | 0 | 0.25 | 0 | 0.25 |
| Yellowness Index ASTM D-1925) | | | | | | | | | | |
| 4 min | 8.9 | 7.2 | 7.9 | 8.0 | 6.3 | 4.3 | 2.98 | 3.67 | 3.84 | 7.58 |
| 8 min | 20.7 | 16.4 | 16.4 | 15.3 | 11.8 | 12.8 | 12.47 | 22.9 | 19.1 | 50.4 |
| 12 min | 53.1 | 33.2 | 38.3 | 27.0 | 25.2 | 27.1 | 34.1 | 58.7 | 56.5 | 118 |
| 16 min | 128.0 | 60.9 | 111.5 | 46.1 | 61.7 | 49.0 | 113 | 114.6 | 198 | |
| 20 min | 156.0 | 116.8 | 153.8 | 76.0 | 157.0 | 90.6 | | | | |
| 24 min | | 168.6 | | 135.1 | | 179.3 | | | | |

*Comparative

Example 4

Same PVC formulation and processing conditions as in Example 1 with various polyacid salt additives

TABLE 5

| | A | A | A | A | A | A | A | A |
|---|---|---|---|---|---|---|---|---|
| Stabilizer | | | | | | | | |
| % mono | 90 | 90 | 90 | 90 | 90 | 90 | 90 | 90 |
| phr of stabilizer | 1 | 0.75 | 0.75 | 0.75 | 0.75 | 0.75 | 0.75 | 0.75 |
| phr mono | 0.9 | 0.675 | 0.675 | 0.675 | 0.675 | 0.675 | 0.675 | 0.675 |
| phr of polyacid Additive | 0 | 0.25 phr Disodium Itaconate | 0.25 phr Disodium maleate | 0.25 phr Disodium succinate | 0.25 phr trisodium phosphate | 0.25 phr disodium citrate | 0.25 sodium benzoate (comparative) | 0.25 sodium stearate (comparative) |
| Yellowness Index ASTM D-1925) | | | | | | | | |
| 4 min | 9.0 | 11.8 | 11.8 | 11.5 | 7.8 | 7.7 | 16.4 | 22.5 |
| 8 min | 18.7 | 19.1 | 20.9 | 21.0 | 16.9 | 20.8 | 30.6 | 46.4 |
| 12 min | 92.0 | 34.6 | 42.4 | 51.8 | 47.4 | 41.3 | 141.3 | 133.2 |
| 16 min | 126.2 | 69.2 | 139.6 | 120.2 | 164.5 | 85.0 | | |
| 20 min | | 133.1 | | | | 162.2 | | |
| 24 min | | | | | | | | |

Example 5

TABLE 6

| PVC Formulation | |
|---|---|
| PVC K-59 (Occidental Petroleum Co.) | 100 phr |
| Calcium Carbonate UFT (Omya) | 10 phr |
| XL-165 Wax (Amerilube 165) | 0.80 phr |
| TiO2 (RCL-4, Tiona) | 5 phr |
| Calcium Stearate (Synpron ® 18F) | 1.3 phr |
| AC-629 PE (polyethylene wax, Honeywell) | 0.2 phr |
| Advalube ® B-3310 (Ester Lubricant, Rohm and Haas Co. | 0.6 phr |
| Paraloid ® K175 Processing Aid (Acrylic copolymer, Rohm and Haas Company) | 2.0 phr |
| Paraloid ® SureCel (Acrylic Processing Aid, Rohm and Haas Company) | 11 phr |
| Stabilizer | |
| Polyacid salt additive | |

70 grams of the above PVC mixture including the stabilizer and polyacid salt additive were charged to the 185° C. heated mixing bowl of a BRABENDER® PLASTICORD rheometer with a paddle speed of 60 RPM. Hot PVC samples were taken from the bowl at the indicated times and the yellowness (indication of thermal stability) measured on a Labscan using ASTM method D-1925.

TABLE 7

| | B | B | D | D | F | F | G | G |
|---|---|---|---|---|---|---|---|---|
| Stabilizer | | | | | | | | |
| % mono | 75 | 75 | 27 | 27 | 27 | 27 | 90 | 90 |
| phr of stabilizer | 2.5 | 1.88 | 2.5 | 1.88 | 2.5 | 1.88 | 2.5 | 1.88 |
| phr mono | 1.88 | 1.41 | 0.675 | 0.508 | 0.675 | 0.508 | 2.25 | 1.69 |
| phr polyacid salt additive | 0 | 0.62 trisodium citrate | 0 | 0.62 trisodium citrate | 0 | 0.62 trisodium citrate | 0 | 0.62 trisodium citrate |
| Yellowness Index ASTM D-1925) | | | | | | | | |
| 3 min | 3.9 | 5.6 | 3.9 | 4.3 | 4.6 | 4.7 | 4.8 | 4.8 |
| 6 min | 7.3 | 8.1 | 6.1 | 8.7 | 5.2 | 5.9 | 6.5 | 6.8 |
| 9 min | 10.2 | 10.2 | 9.4 | 11.1 | 8.4 | 8.3 | 9.4 | 9.1 |
| 12 min | 11.6 | 12.5 | 13.3 | 12.7 | 10.5 | 11.5 | 14.6 | 12.6 |
| 15 min | 18.9 | 18.0 | 15.0 | 15.7 | 13.3 | 14.5 | 25.9 | 14.6 |

The invention claimed is:

1. A stabilized halogen containing polymer composition comprising:
   a) greater than 40% by weight of a halogenated polymeric material;
   b) 0.01 to 5.0 phr per hundred parts of a methyl tin stabilizer comprising a mixture of mono methyl tin stabilizer and dimethyl tin stabilizer wherein the mono methyl tin stabilizer is greater than 25% by weight of the methyl tin stabilizer; and
   c) 0.01 to 5 phr of a salt of a polyacid material to form the stabilized halogen containing polymer composition;
   wherein the salt of the polyacid material is a salt of either a polycarboxylic acid, a phosphoric acid, a sulfonic acid or a boric acid;
   further wherein the salt of the polycarboxylic acid comprises salts of adipic acid, succinic acid, itaconic acid, glutamic acid, citric acid.

2. A stabilized halogen containing polymer composition comprising: a) greater than 40% by weight of a halogenated polymer material wherein the halogenated polymer material comprises vinyl chloride, vinyl fluoride, vinylidene chloride, and vinylidene fluoride, and chlorinated polyvinyl chloride, chlorinated polyethylene or mixtures thereof; b) greater than 0.3 phr of a monomethyl tin stabilizer; and c) 0.01 to 5 phr of a salt of a polyacid material.

* * * * *